United States Patent [19]
Kelchner

[11] Patent Number: 5,398,907
[45] Date of Patent: Mar. 21, 1995

[54] HANGER FOR VEHICLE EXHAUST SYSTEMS AND THE LIKE

[75] Inventor: James C. Kelchner, Bloomfield Hills, Mich.

[73] Assignee: Chemcast Corporation, Madison Heights, Mich.

[21] Appl. No.: 898,085

[22] Filed: Jun. 12, 1992

[51] Int. Cl.$^6$ ................................................ F16L 3/16
[52] U.S. Cl. .................................... 248/634; 248/60; 248/610; 267/140.3; 267/152; 267/259; 267/292
[58] Field of Search ................. 248/58, 60, 74.2, 74.3, 248/317, 610, 634, 635, 638, 612; 180/291; 24/68 CD, 300, 301; 267/140.3, 141, 141.1, 141.2, 141.4, 141.5, 141.6, 151, 152, 153, 259, 276, 280, 282, 292, 294

[56] References Cited

U.S. PATENT DOCUMENTS

| | | | |
|---|---|---|---|
| 4,415,391 | 11/1983 | Reid | 248/60 X |
| 4,573,842 | 3/1986 | Mantela et al. | 267/152 X |
| 4,796,841 | 1/1989 | Baker et al. | 248/60 |
| 4,817,909 | 4/1989 | Deane | 248/60 |
| 4,884,779 | 12/1989 | Dräbing et al. | 248/610 |

Primary Examiner—Richard K. Seidel
Assistant Examiner—Raymond D. Woods
Attorney, Agent, or Firm—Lalos & Keegan

[57] ABSTRACT

A hanger for suspending a first component from a second elevated component comprising a first body member formed of a thermoplastic elastomer having a first durometer hardness and a tensile strength sufficient to support the first component, and having a pair of spaced openings therein; a second body member formed of a thermoplastic elastomer having a durometer hardness less than the first durometer hardness, disposed within one of the openings of the first body member and being molded integrally therewith and having an opening therein for receiving an attachment element of the second elevated component; and a third body member formed of a thermoplastic elastomer having a durometer hardness less than the first durometer hardness, disposed within the other of the openings of the first body member and being molded integrally therewith and having an opening therein for receiving an attachment element of the first component; the materials of the second and third body member being compatible with the material of the first body member to permit the molding of the second and third body members with the first body member in a semi-molten state whereby the materials are molded together to provide an integral structure of at least a dual durometer hardness.

15 Claims, 2 Drawing Sheets

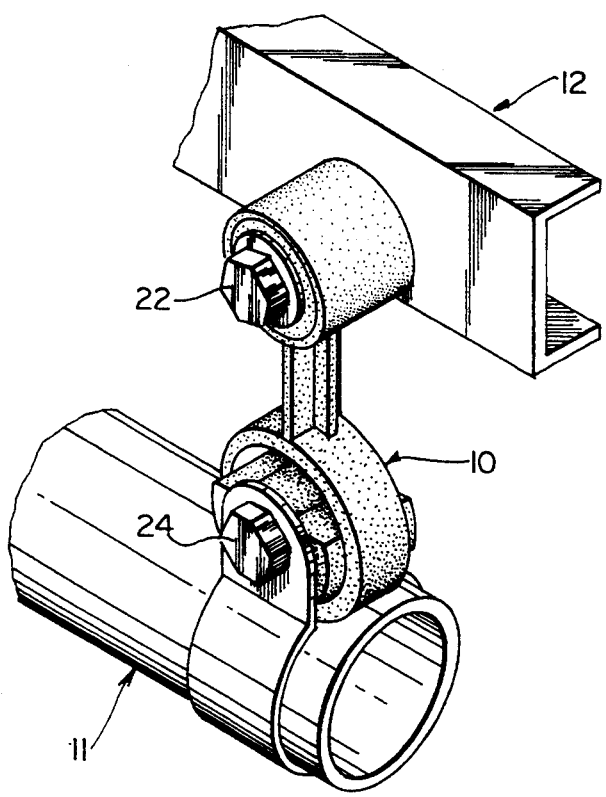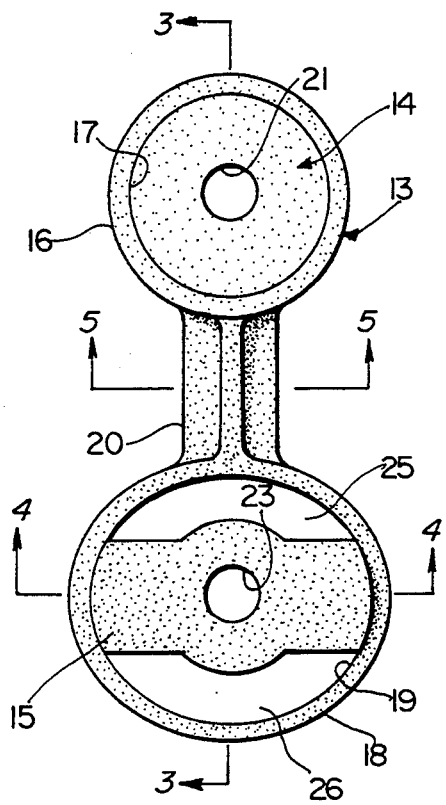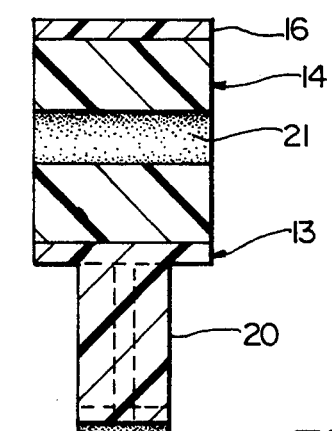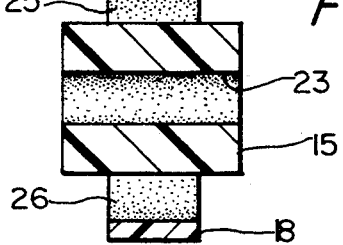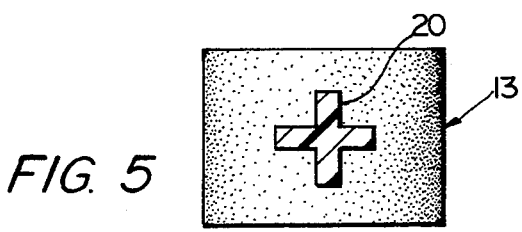

HANGER FOR VEHICLE EXHAUST SYSTEMS AND THE LIKE

This invention relates to a hanger device and more particularly to a hanger device suitable for suspending an engine exhaust system from the underside of a vehicle body.

In most vehicles provided with engine exhaust systems, there usually are provided various hanger devices for suspending such systems from the undersides of the vehicles. Typically, such devices are used not only to support the exhaust system but to dampen vibrations to impede the transmission of engine vibrations through the exhaust system to the floor of the vehicle, and to attenuate sound. To provide such functions, such hangers commonly are constructed of an elastomeric material such as rubber or various combinations of elastomer materials provided with various reinforcing materials such as metals, synthetic materials such as nylon and the like. In addition to such functions, such devices provide for thermal expansion of the exhaust system components as such components are heated during operation of the vehicle.

Most of such prior art devices, however, have been found not to be entirely satisfactory in performance in that they provide for either the use of comparatively costly materials or a relatively costly manufacturing process. It thus has been found to be desirable to provide a hanger device of the type described which not only will provide for adequate support of the exhaust system, the dampening of engine vibrations, the attenuation of sound and the thermal expansion of the exhaust system components but which will be economical to manufacture and which will be consistently effective in performance over the service life of the vehicle on which it is installed.

Generally, the present invention provides for a hanger device consisting of a first body member formed of a thermoplastic elastomer of a certain durometer hardness to provide a tensile strength sufficient to carry the load to be suspended from the hanger, and having a set of openings therein, a second body member disposed in one of the openings in the first body member, formed of a thermoplastic elastomer having a durometer hardness less than the durometer hardness of the first body member and an opening therein for receiving an attachment element of an elevated component, and a third body member disposed in the other opening in the first body member, formed of a thermoplastic elastomer also having a durometer hardness less than the durometer hardness of the first body member and an opening therein for receiving an attachment element of a component to be the suspended from the hanger. Although the several body members have different durometer hardnesses, they are formed of compatible thermoplastic elastomers so that they may be molded together to form an integral structure of at least a dual durometer hardness.

The tensile strength of the hanger is provided by the first body member having a greater durometer hardness, and the vibration dampening and noise attenuating properties are provided by the second and third body members interposed between the first body member and the attachment elements, having a lesser durometer hardness. Certain additives such as fiberglass and mica can be added to the member compounds to enhance their properties. Fiberglass particularly may be added to enhance the tensile strength and heat resistant properties of the body members.

The hanger preferably is formed in an injection molding machine having first and second stage molds in which the first body member compound is injected into a first set of mold cavities to form the first body member, and then, as the first body member compound is in a semi-molten state, the second and third body member compounds are injected into a second set of mold cavities containing the semi-molten first body member to form the final integral structure. The semi-molten state of the first body member and the compatibility of the thermoplastic elastomer compounds of the several body members permits the resulting structure to form an integral molded unit having at least a dual durometer. The particular durometer hardnesses of the several bodies are determined by the specific application of the hanger although the second and third body members are intended to have a lower hardness than the first body member to provide the desired vibration dampening and noise attenuating properties of the hanger.

Accordingly, it is the principal object of the present invention to provide an improved hanger device particularly suitable for suspending a vehicle exhaust system from a vehicle body.

Another object of the present invention is provide an improved hanger device suitable for use in suspending an vehicle exhaust system from a vehicle body which is effective in dampening engine vibrations and thus impeding the transmission of such vibrations to the vehicle body, attenuating sound and providing for the thermal expansion of the exhaust system being supported as the exhaust system becomes heated during operation of the vehicle.

A further object of the present invention is to provide an improved hanger device for suspending an engine exhaust system from a vehicle body which is comparatively simple in design, relatively inexpensive to manufacture and highly effective in performance.

Other objects and advantages of the present invention will become more apparent to those persons having ordinary skill in the art to which the present invention pertains from the following description taken in conjunction with the accompanying drawings wherein:

FIG. 1 is a perspective view of a hanger device for suspending an engine exhaust system from the body of a vehicle, embodying the present invention;

FIG. 2 is a front, elevational view of the embodiment shown in FIG. 1;

FIG. 3 is a cross-sectional view taken along line 3—3 in FIG. 2;

FIG. 4 is a cross-sectional view taken along line 4—4 in FIG. 2;

FIG. 5 is a cross-sectional view taken along line 5—5 in FIG. 2;

Figure 6:
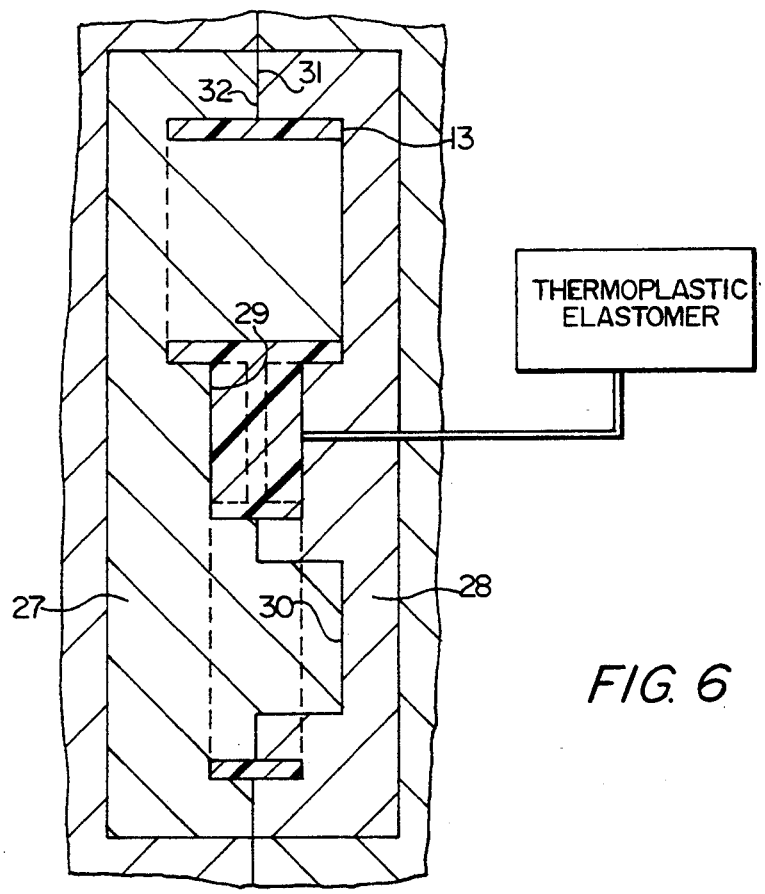
FIG. 6 is a cross-sectional view of a first set of mold cavities for injection molding a first portion of the device shown in FIGS. 1 through 5.

Referring to FIG. 1 of the drawings, there is illustrated a hanger device 10 embodying the present invention which is adapted to suspend a component 11 of an engine exhaust system from a component 12 of a vehicle body. As best shown in FIG. 2, the hanger device consists of a first molded body member 13, a second molded body member 14 and a third molded body member 15, molded together to form an integral unit. Molded body member 13 includes an annular section 16 providing a cylindrical opening 17 therethrough, an annular section 18 providing a cylindrical opening 19 therethrough and a connecting section 20 having a cross-shaped cross-sectional configuration. Molded body member 13 is formed of a molded thermoplastic elastomer material having a tensile strength sufficient to carry the load of the exhaust system which is secured thereto.

Molded body member 14 is disposed within cylindrical opening 17 and molded integrally with annular section 16 of molded body member 13. It is formed of a thermoplastic elastomer compatible with the material of molded body member 13 to permit the members to be molded together as integral unit, and has a durometer hardness less than the durometer hardness of molded body member 13. Body member 14 further is provided with an axial opening 21 for receiving an attachment element such as a bolt 22 for securing the hanger device from vehicle body component 12.

Molded body member 15 is disposed within cylindrical opening 19 of annular section 18, and also is molded integrally with annular section 18. It similarly consists of a thermoplastic material which is compatible with the material of molded body member 13 and also has a durometer hardness less than the durometer hardness of molded body member 13. Body member 15 further is provided with an axial opening 23 adapted to receive an attachment element such as a bolt 24 as shown in FIG. 1. Body member 15 does not entirely fill cylindrical opening 19 in annular section 18 but instead spans opposed sides of annular section 18, providing an upper space 25 disposed between body member 15 and annular section 18 and a lower space 26 between body member 15 and annular section 18. It thus will be seen that in addition to the composition of the material of body member 15, the spacing above and below the body member permits body member 15 to displace diametrically relative to annular section 18 to enhance its vibration dampening and sound attenuating capabilities. Depending on the particular application and requirements of the hanger device, the configuration of body member 15 can be enlarged to fill the lower space 26 and possibly even upper space 25.

Figure 7:
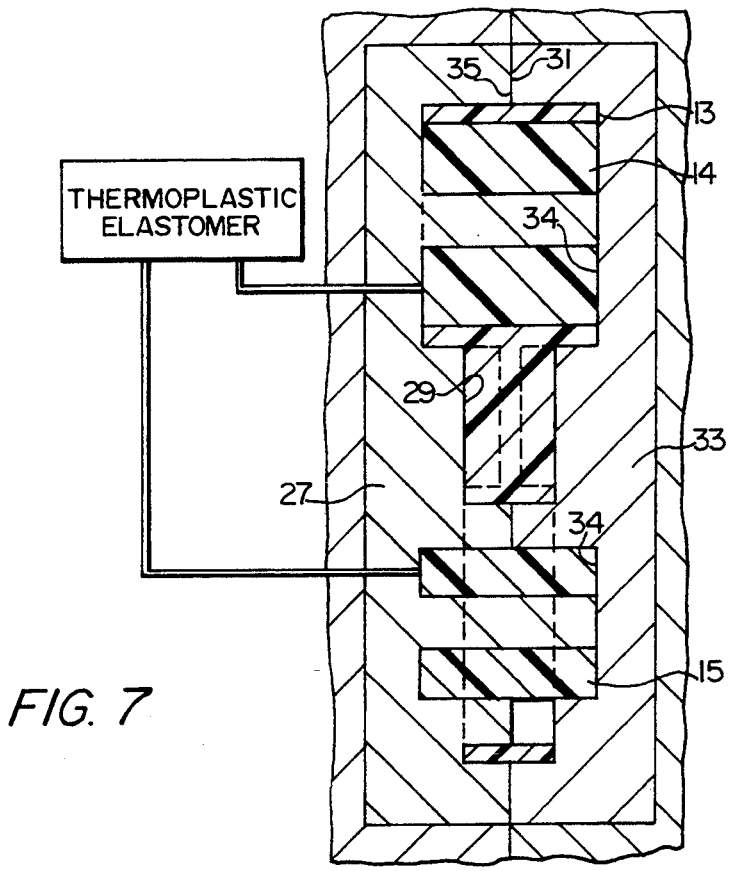
FIG. 7 is a cross-sectional view of a second set of mold cavities of an injection molding machine for forming a second portion of the embodiment shown in FIGS. 1 through 5.

Referring to FIGS. 6 and 7, there is illustrated two sets of molds for injection molding the hanger device as described in a two-stage injection process. In the first stage, body member 13 is formed with a thermoplastic material having a comparatively higher durometer hardness and in the second stage, while body member 13 is in a semi-molten state, body members 14 and 15 are formed by injecting a material having a comparatively lower durometer hardness into the second set of molds. As the second thermoplastic material is injected into the second set of molds, the several body members become molded together to form an integral unit.

FIG. 6 illustrates a set of molds 27 and 28 having mold cavities 29 and 30, and mating surfaces 31 and 32, respectively. The set of molds shown in FIG. 6 are disposed at a first station of the injection molding machine and provide for the formation of body member 13 by means of the injection of a molten thermoplastic elastomer material having a comparatively high durometer hardness into mated cavities 29 and 30.

FIG. 7 illustrates a second set of molds used in the second stage to mold the hanger device. The set consists of a mold 27 provided with mold cavity 29 and a mold 33 having a mold cavity 34 cooperating with mold cavity 29 and a mating surface 35 engaging mating surface 31 of mold 27 when the molds are closed during the second stage of the molding process. In the conventional manner, a thermoplastic elastomer material having a durometer hardness less than the durometer hardness of the material forming body member 13 is injected into mold cavity 34 to become integrally molded with body member 13 formed in the first stage of the process and subsisting in a semi-molten state.

The injection molding of the hanger device preferably is performed on a machine having a first station in which the first stage molding occurs and a second station in which the second stage molding occurs. In the first station, molds 27 and 28 are mated to inject the first material to form body member 13. The mold sections are then indexed by rotating one mold relative to the other to mate molds 27 and 33 while body member 13 remains heated in a semi-molten state in cavity 29 of mold 27, and the second material is injected into the second set of mold cavities at the second station to form body members 14 and 15 and bond them to body member 13 to form an integral structure.

A variety of thermoplastic or thermosetting elastomers can be used for the harder and softer materials of the hanger device. Preferably, body member 13 is formed of a material having a durometer hardness in the range of 40 to 90 Shore D, and body members 14 and 15 each is formed of a material having a durometer hardness in the range of 20 to 90 Shore A.

In the preferred embodiment of the invention, body member 13 is formed of a thermoplastic material and body members 14 and 15 are formed of a thermoplastic polyolefinic elastomer consisting of fully cured elastomer particles dispersed in a continuous thermoplastic matrix. Body member 13 may be formed either of a virgin polypropylene material or a polypropylene material provided with certain additives depending upon the specifications of the hanger. Fiberglass may be added to enhance the strength and rigidity of the material. Mica may be added to enhance rigidity to a greater extent but would have the added effect of reducing tensile and shear strength. The preferred durometer hardness of body member 13 material is 65±5 Shore D.

Body members 14 and 15 of the hanger preferably are formed of KRATON G or SANTOPRENE. KRATON G is a high performance thermoplastic polyolefinic elastomer manufactured and sold by the Shell Chemical Company of Houston, Texas. It is a styrene-ethylene/butylene-styrene (SEBS) block polymer which exhibits a high temperature, chemical, oxidation and weather resistance. SANTOPRENE is a high performance thermoplastic polyolefinic elastomer manufactured and sold by the Monsanto Polymer Products Company of Akron, Ohio. It is a fully vulcanized polyolefinic material produced by a proprietary vulcanization process by Monsanto. The specific hardness of body members 14 and 15 is dependent upon the specifications of the hanger. Durometer hardnesses of 35±5 Shore A and 55±5 Shore A for body members 14 and 15 may be used for different applications.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A hanger for suspending a first component from a second elevated component comprising:

a first body member formed of a thermoplastic elastomer having a first durometer hardness and a tensile strength sufficient to support said first component, and having a pair of spaced openings therein;

a second body member disposed within a first one of said openings of said first body member and being molded integrally therewith and having an opening therein for receiving an attachment element of said second elevated component, said second body member being formed of a thermoplastic elastomer compatible with said first body member thermoplastic elastomer, said second body member thermoplastic elastomer having a durometer hardness less than said first durometer hardness; and a third body member disposed within a second one of said openings of said first body member and being molded integrally therewith and having an opening therein for receiving an attachment element of said first component, said third body member being formed of a thermoplastic elastomer compatible with said first body member thermoplastic elastomer, said third body member thermoplastic elastomer having a durometer hardness less than said first durometer hardness; and whereupon the first body member, the second body member and the third body member form an integral structure having at least a dual durometer hardness.

2. A hanger according to claim 1 wherein said first body member is formed of a material having a durometer hardness in the range of 40 to 90 Shore D, and the second and third body members are formed of materials each having a durometer hardness in the range of 20 to 90 Shore A.

3. A hanger according to claim 1 wherein said first body member is formed of a material having a durometer hardness of 65±5 Shore D and said second and third body members each are formed of a material having a durometer hardness of 35±5 Shore A.

4. A hanger according to claim 1 wherein said first body member is formed of a material having a durometer hardness of 65±5 Shore D and said second and third body members each are formed of a material having a durometer hardness of 55±5 Shore A.

5. A hanger according to claim 1 wherein said second body member and said attachment element of said second elevated component completely fill said first one of said first body member openings and said third body member only partially fills said second one of said first body member openings.

6. A hanger according to claim 5 wherein said third body member spans a pair of opposed sides of said second one of said first body member openings.

7. A hanger according to claim 5 wherein said third body member fills only a lower portion of said second one of said first body member openings.

8. A hanger for suspending a first component from a second elevated component comprising:

a first body member formed of a thermoplastic elastomer having a first durometer hardness and a tensile strength sufficient to support said first component, and having a first annular section, a second annular section and an interconnecting section interconnecting said first annular section and said second annular section;

a second body member disposed within and molded integrally with said first annular section of said first body member, and having an opening therein for receiving an attachment element of said second elevated component, said second body member being formed of a thermoplastic elastomer compatible with said first body member thermoplastic elastomer, said second body member thermoplastic elastomer having a durometer hardness less than said first durometer hardness; and a third body member disposed within and molded integrally with said second annular section of said first body member, and having an opening therein for receiving an attachment element of said first component, said third body member being formed of a thermoplastic elastomer compatible with said first body member thermoplastic elastomer, said third body member thermoplastic elastomer having a durometer hardness less than said first durometer hardness;

whereupon the first body member, the second body member and the third body member form an integral structure having at least a dual durometer hardness.

9. A hanger according to claim 8 wherein said interconnecting section of said first body member has a cross-shaped cross-sectional configuration.

10. A hanger according to claim 8 wherein said first body member is formed of a material having a durometer hardness in the range of 40 to 90 Shore D, and said second and third body members are formed of materials having a durometer hardness in the range of 20 to 90 Shore A.

11. A hanger according to claim 8 wherein said first body member is formed of a material having a durometer hardness of 65±5 Shore D and said second and third body members are formed of a material having a durometer hardness of 35±5 Shore A.

12. A hanger according to claim 8 wherein said first body member is formed of a material having a durometer hardness of 65±5 Shore D and said second and third body members are formed of a material having a durometer hardness of 55±5 Shore A.

13. A hanger according to claim 8 wherein said second body member and said attachment element of said second elevated component completely fill the first annular section of said first body member and said third body member only partially fills the second annular section of said first body member.

14. A hanger according to claim 13 wherein said third body member spans a pair of opposed sides of said second annular section.

15. A hanger according to claim 13 wherein said third body member fills only a lower portion of said second annular section of said first body member.

* * * * *